Patented Apr. 3, 1923.

1,450,462

UNITED STATES PATENT OFFICE.

RICHARD A. TERHUNE, OF FAIRHAVEN, MASSACHUSETTS, ASSIGNOR, BY MESNE ASSIGNMENTS, TO CONRAD GASCHOTT, OF CORONA, NEW YORK.

METHOD OF ACIDIZING RUBBER WASTE.

No Drawing. Application filed April 23, 1921. Serial No. 463,997.

*To all whom it may concern:*

Be it known that I, RICHARD A. TERHUNE, a citizen of the United States, and a resident of Fairhaven, county of Bristol, Massachusetts, have invented a certain new and useful Method of Acidizing Rubber Waste, of which the following is a specification.

In various processes of reclaiming rubber sulphuric acid has been used for many years as a means of destroying fibre. For this purpose it has heretofore been considered necessary to use the acid very hot, (generally at its boiling temperature), in order to have the acid act with sufficient rapidity to prevent the injurious effects on the rubber which result from long immersion in the acid. The high temperatures used are not good for the rubber but have generally been found necessary.

My invention relates to a new method of applying acid to rubber waste and is based on my discovery that if the waste is moistened and torn up so that the fibre is largely exposed, the fibre will absorb and be acted upon by relatively cool acid whereas the rubber will be practically unaffected owing to the small amount of acid that will displace the water absorbed by the rubber. The result of this is that the acid can be left in contact with the waste long enough to destroy the fibre sufficiently so that it can readily be washed from the mass with almost no appreciable effect on the rubber. This process is particularly adapted for use with uncured scrap which contains vulcanizing agents such as sulphur and an accelerator which will cause the rubber if heated to become harsh and less adapted for re-use.

The use of my process not only gives a superior product but results in certain economies of operation, for I find it advantageous to apply the acid by pouring or sprinkling it over the waste and permitting the surplus to drain off, instead of soaking the waste in the acid. This demands only a small stock of acid and permits the use of bins from which the material can be dumped, whereas an immersion process demands the use of acid-tight tubs which are expensive to maintain and from which the waste can be removed only with considerable labor.

In carrying out my process, the waste is put through the mills, known as crackers and at the same time is moistened. The crackers, which are standard equipment and whose operation is well understood in the art, form a sheet or mat of the uncured waste. Such sheet is then torn up in some appropriate manner, such for example as by the process described in United States Patent No. 1,321,201. If desired, other forms of shredding may be employed which will not separate the fibre from the rubber. While some of the water will be eliminated from the mass during the tearing step, those who are familiar with the drying of rubber will recognize that the rubber will still contain a large amount of moisture.

The torn up mass is then carried to the treatment bins which are preferably raised from the ground and so built that the bottom can be opened to permit the contents to fall out. Sulphuric acid which preferably should not have a strength greater than that equivalent to a gravity of 30° Baumé, and which has been heated to a temperature of from 60 C. to 100 C. is then poured over the mass and allowed to percolate through it until the waste is well wet with the acid. Even when acid of a temperature of 100° C. is used, it will be rapidly cooled by the waste so that a far different effect will be produced than would be the case if the waste were soaked in acid maintained at a temperature of 100° C. I find however that ordinarily it is advisable to use acid at a temperature of about 70° C. The residual acid that drains out from the bottom of the bin is collected for re-use.

Ordinarily I permit the mass to drain for twenty-four hours but this time may be shortened if a second application of acid is made, as for example at the end of four hours.

After the acid has acted a sufficient length of time to practically destroy the strength of the fibre, water at a temperature of from 60° C. to 80° C. is poured over the mass and allowed to percolate through. This first wash water will be found to contain enough acid so that it may profitably be saved and used for diluting strong acid when making up new batches of solution.

The waste is removed from the bins by opening them at the bottom and permitting the mass to slide into a tank where it is rough washed. The rubber is then mill washed preferably on wash mills of the type shown in United States Patent No. 1,267,492 and is then sheeted and dried.

In order that the method of carrying out my invention may be clearly understood, I will describe an illustrative operation in detail:

Bales of uncured friction scrap were first torn apart into large slabs and bunches. These were passed through heavy crackers to flatten the lumps and at the same time the material was moistened. It was then passed through other crackers, the rollers of which were set together, closely enough to tear and crush the fabric and sheet the material. It was then passed through the picking process described in United States Patent No. 1,321,201. The resulting particles and lumps of rubber which still contained an appreciable amount of cotton fibre were then dumped into a bin, having a capacity of two hundred and seventy cubic feet; the bin was lead lined and was so built that the material could be dumped from the bottom and the acid would drain off. When the bin was filled up, one thousand gallons of sulphuric acid solution of a strength equivalent to a specific gravity of 24° Baumé at a temperature of 70° C. was poured over the mass. The residual acid being collected at the bottom. After draining for twenty-four hours, the strength of the fibre was substantially destroyed. The mass was then washed with water at a temperature of 70° C. and allowed to drain for a short time. The contents of the bin were dumped out, washed free from acid and the remnants of the fibre, sheeted and dried. It is to be understood that the foregoing example is given for the purpose of illustration only and can be modified in many particulars without departing from the spirit of my invention.

What I claim is:

1. In the process of reclaiming rubber waste the steps of treating the waste with an acid adapted to destroy the strength of the fiber and permitting the fiber to be acted on by absorbed acid without subjecting the rubber to a long immersion in the acid.

2. The method of reclaiming rubber waste which comprises the steps of tearing up the waste to expose the fiber, permitting the fabric to absorb an acid adapted to destroy the strength of the fiber, permitting the acid to act on the fiber without subjecting the rubber to a long immersion in the acid and washing out the acid and acidized fiber, all while maintaining the temperature of the mass of rubber below 100° C.

3. The method of reclaiming rubber waste which comprises the steps of tearing up the waste to expose the fiber, permitting the fiber to absorb diluted sulphuric acid, permitting the acid to act on the fiber without subjecting the rubber to a long immersion in the acid and washing out the acid and acidized fiber.

4. The method of reclaiming rubber waste which comprises the steps of moistening the waste and tearing it up to expose the fiber, acidizing the fiber by wetting the waste with a warm solution of an acid adapted substantially to destroy the strength of the fiber, permitting surplus acid to drain from the mass, permitting the absorbed acid to act on the fiber at a temperature below 100° C., until the strength of the fiber is destroyed and then washing out the absorbed acid and the remnants of the fiber.

RICHARD A. TERHUNE.